(12) United States Patent
Wu et al.

(10) Patent No.: US 11,455,491 B2
(45) Date of Patent: Sep. 27, 2022

(54) METHOD AND DEVICE FOR TRAINING IMAGE RECOGNITION MODEL, AND STORAGE MEDIUM

(71) Applicant: BEIJING XIAOMI PINECONE ELECTRONICS CO., LTD., Beijing (CN)

(72) Inventors: Lei Wu, Beijing (CN); Yuan Chen, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 174 days.

(21) Appl. No.: 16/938,693

(22) Filed: Jul. 24, 2020

(65) Prior Publication Data
US 2021/0224592 A1    Jul. 22, 2021

(30) Foreign Application Priority Data
Jan. 22, 2020 (CN) .......................... 202010075300.1

(51) Int. Cl.
*G06K 9/62* (2022.01)
*G06N 3/08* (2006.01)

(52) U.S. Cl.
CPC .......... *G06K 9/6256* (2013.01); *G06K 9/6223* (2013.01); *G06N 3/08* (2013.01)

(58) Field of Classification Search
CPC ...... G06K 9/6259; G06K 9/62; G06K 9/6289; G06K 9/6228; G06K 9/6217; G06K 9/6256; G06K 9/6267
See application file for complete search history.

(56) References Cited

U.S. PATENT DOCUMENTS

2008/0103996 A1    5/2008   Forman et al.
2012/0310864 A1*  12/2012   Chakraborty ........ G06K 9/6262
                                                706/12

OTHER PUBLICATIONS

Jingbo Zhu et al., Active Learning with Sampling by Uncertainty and Density for Word Sense Disambiguation and Text Classification. In Proceedings of the 22nd International Conference on Computational Linguistics (Coling 2008), pp. 1137-1144, Manchester, UK. Coling 2008 Organizing Committee. (Year: 2008).*
Extended European Search Report in the European Application No. 20188073.9, dated Jan. 13, 2021, (13p).
(Continued)

*Primary Examiner* — Ross Varndell
(74) *Attorney, Agent, or Firm* — Arch & Lake LLP

(57) ABSTRACT

A method and a storage medium are provided for training an image recognition model. An image recognition model is trained by using a tagged image sample set. Multiple to-be-tagged image samples in a to-be-tagged image sample set are recognized by using the image recognition model to obtain a confidence level of a recognition result corresponding to each of the multiple to-be-tagged image samples. At least one to-be-tagged image sample of which the confidence level is in a preset interval is selected as at least one to-be-tagged image sample to form a first to-be-tagged image sample set. Tags of to-be-tagged image samples in the first to-be-tagged image sample set is acquired. An updated tagged image sample set is obtained by updating the tagged image sample set according to the acquired tags. The image recognition model is trained by using the updated tagged image sample set.

16 Claims, 6 Drawing Sheets

(56) References Cited

OTHER PUBLICATIONS

Zhu, Jingbo, et al., "Active learning with sampling by uncertainty and density for word sense disambiguation and text classification", Proceedings of the 22nd International Conference on Computational Linguistics, COLING '08, vol. 1, Jan. 1, 2008, Morristown, NJ, (8p).

Holub, Alex, et al., "Entropy-based active learning for object recognition" Computer Vision and Pattern Recognition Workshops, 2008. CVPR Workshops 2008. IEEE Computer Society Conference On, IEEE, Piscataway, NJ, Jun. 23, 2008, (8p).

\* cited by examiner

METHOD AND DEVICE FOR TRAINING IMAGE RECOGNITION MODEL, AND STORAGE MEDIUM

CROSS-REFERENCE TO RELATED APPLICATION

This application is based upon and claims priority of Chinese Patent Application No. CN202010075300.1, filed on Jan. 22, 2020, the entire contents of which are incorporated herein by reference for all purposes.

TECHNICAL FIELD

The present disclosure is related to the field of information technology, and more specifically, to a method and device for training an image recognition model and a storage medium.

BACKGROUND

An image may be recognized through an image recognition model trained through sample data. However, before the image recognition model is used to recognize an image, training of the image recognition model is performed with image samples. In the related art, an image sample, after being selected, is required to be manually tagged. For ensuring an adequate recognition capability of an image recognition model, a large number of tagged image samples are required for training, while if completely manual tagging is adopted, it is apparent that the image recognition model has the problems of low training efficiency, high labor cost and the like.

SUMMARY

The present disclosure provides a method and device for training an image recognition model and a storage medium.

According to a first aspect of the present disclosure, there is provided a method for training an image recognition model. The method may include training an image recognition model by using a tagged image sample set. The method may further include recognizing multiple to-be-tagged image samples in a to-be-tagged image sample set by using the image recognition model to obtain a confidence level of a recognition result corresponding to each of the multiple to-be-tagged image samples. The method may include selecting at least one to-be-tagged image sample of which the confidence level may be within a preset interval to form a first to-be-tagged image sample set. The method may include acquiring tags of to-be-tagged image samples in the first to-be-tagged image sample set. The method may additionally include obtaining an updated tagged image sample set by updating the tagged image sample set according to the acquired tags. The method may include training the image recognition model by using the updated tagged image sample set.

According to a second aspect of the present disclosure, there is provided a device for training an image recognition model. The device may include one or more processors, a non-transitory computer-readable storage medium, storing instructions executable by the one or more processors. The one or more processors may be configured to train an image recognition model by using a tagged image sample set. The one or more processors may further be configured to recognize multiple to-be-tagged image samples in a to-be-tagged image sample set by using the image recognition model to obtain a confidence level of a recognition result corresponding to each of the multiple to-be-tagged image samples. The one or more processors may be configured to select at least one to-be-tagged image sample of which the confidence level may be within a preset interval as at least one to-be-tagged image sample to form a first to-be-tagged image sample set. The one or more processors may additionally be configured to acquire tags of to-be-tagged image samples in the first to-be-tagged image sample set. The one or more processors may be configured to obtain an updated tagged image sample set by updating the tagged image sample set according to the acquired tags. The one or more processors may be further configured to train the image recognition model by using the updated tagged image sample set.

According to a third aspect of the present disclosure, there is provided a non-transitory computer-readable storage medium having stored therein instructions, when being executed by one or more processors, enable the one or more processors to implement the steps of a method including training an image recognition model by using a tagged image sample set. The method may further include recognizing multiple to-be-tagged image samples in a to-be-tagged image sample set by using the image recognition model to obtain a confidence level of a recognition result corresponding to each of the multiple to-be-tagged image samples. The method may include selecting at least one to-be-tagged image sample of which the confidence level may be within a preset interval to form a first to-be-tagged image sample set. The method may additionally include acquiring tags of to-be-tagged image samples in the first to-be-tagged image sample set. The method may include obtaining an updated tagged image sample set by updating the tagged image sample set according to the acquired tags. The method may further include training the image recognition model by using the updated tagged image sample set.

It is to be understood that the above general descriptions and detailed descriptions below are only examples and explanatory and not intended to limit the present disclosure

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. "A/an," "said" and "the" in a singular form in the embodiments of the present disclosure and the appended claims are also intended to include a plural form, unless other meanings are clearly denoted throughout the present disclosure. It is also to be understood that the term "and/or" used in the present disclosure refers to and includes one or any or all possible combinations of multiple associated items that are listed.

It is to be understood that, although terms "first," "second," "third," and the like may be adopted to describe various information in the embodiments of the present disclosure, the information should not be limited to these terms. These terms are only adopted to distinguish the information of the same type. For example, without departing from the scope of the embodiments of the present disclosure, first information may also be called second information and, similarly, second information may also be called first information. For example, the term "if" used here may be explained as "while" or "when" or "responsive to determining," which depends on the context.

Figure 1:
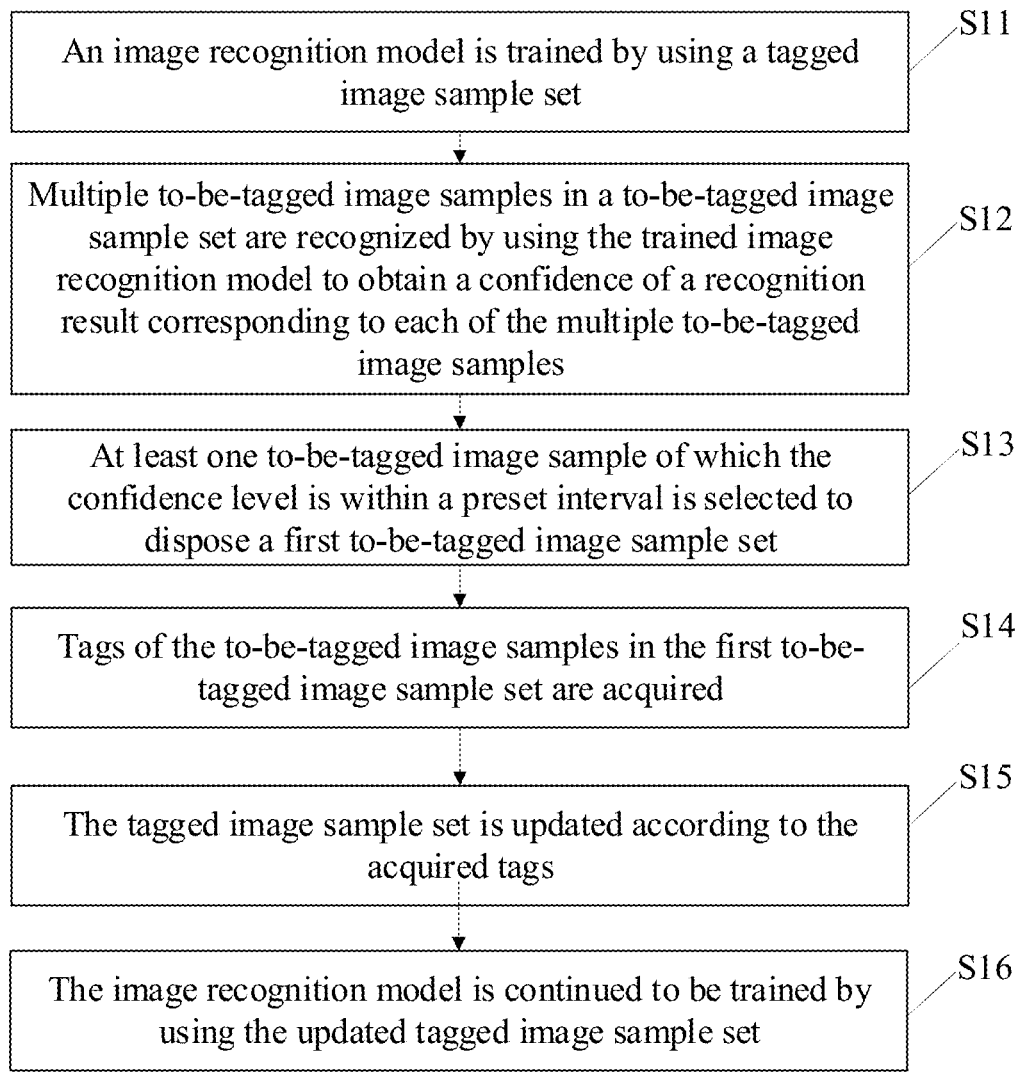
FIG. 1 is a flowchart showing a method for training an image recognition model, according to an example of the present disclosure.

As shown in FIG. 1, an embodiment provides an image recognition model training method, which includes the following steps.

In S11, an image recognition model is trained by using a tagged image sample set. For example, the tagged image sample set may be a set of sample images that have been tagged by a user and may be used to train the image recognition model to identify images based on objects, people, and places in the image.

In S12, multiple to-be-tagged image samples in a to-be-tagged image sample set are recognized by using the presently trained image recognition model to obtain a confidence level of a recognition result corresponding to each of the multiple to-be-tagged image samples. For example, the image recognition model may identify multiple to-be-tagged image samples in a to-be-tagged image sample set using a confidence level.

In S13, at least one to-be-tagged image sample of which the confidence level is within a preset interval is selected as at least one to-be-tagged image sample to dispose a first to-be-tagged image sample set.

In S14, tags of the to-be-tagged image samples in the first to-be-tagged image sample set are acquired.

In S15, the tagged image sample set is updated according to the acquired tags.

In S16, the image recognition model is continued to be trained by using the updated tagged image sample set.

A positive image sample and a negative image sample are two different types of images. For example, the positive image sample is a target type of image required to be recognized, and the negative image sample may be another type of image except for the target type of image.

In some embodiments of the present disclosure, a training set (i.e., an image sample set for training the image recognition model) may include a tagged image sample set and a to-be-tagged image sample set.

At first, model training is performed by the use of the tagged image sample set. In this way, after being trained based on a certain number of image samples in the tagged image sample set, the image recognition model may have an initial recognition capability.

The to-be-tagged image samples in the to-be-tagged image sample set are input into the image recognition model, and the image recognition model may output the recognition results of the to-be-tagged image samples and confidences of the recognition results. If the confidence is higher, it is indicated that the recognition result given by the image recognition model is more accurate. For example, if the image recognition model is a two-type recognition model, the recognition result output by the image recognition model may include "0" or "1". For example, "0" corresponds to the target type of image, and "1" corresponds to the other type of image except for the target type. For example, when it is determined whether an image is an intensive phobia image, there are two recognition results, i.e., "YES" and "NO." In such case, confidence of the recognition result of a to-be-tagged image sample may range from 0.5 to 1, if the confidence is closer to 1, the recognition accuracy is higher, and if the confidence is closer to 0.5, the recognition accuracy is lower, and the recognition capability of the image recognition model is relatively low for the image sample. If the confidence of a to-be-tagged image sample is 0.5, it means that the confidence when the image sample is determined to belong to each of the two types is 0.5, respectively. Therefore, such a to-be-tagged image sample is necessary to be tagged to continue model training so as to improve the generalization capability of the image recognition model.

In some embodiments of the present disclosure, in S13, the to-be-tagged image sample of which the confidence is within the preset interval may form the first to-be-tagged image sample set. For example, the preset interval may be from 0.5 to 0.8, from 0.5 to 0.75, from 0.5 to 0.7, or from 0.5 to 0.6.

In this way, for a to-be-tagged image sample of which the confidence is 0.9 or 0.95, the recognition capability of the image recognition model is adequate, which indicates that the present tagged image sample set has been provided with enough similar image samples and no further to-be-tagged image sample is required to be tagged.

The confidence may be a value of a confidence function. For example, the confidence function includes, but not limited to, a softmax function. The confidence may be a value calculated through the softmax function.

In some embodiments, if an image sample includes a positive image sample and a negative image sample, the to-be-tagged image sample of which the recognition result is a positive image sample and the confidence is within the preset interval may be selected to form the first to-be-tagged image sample set in S13. The to-be-tagged image sample of which the recognition result is a negative image sample is not added into the first to-be-tagged image sample set, and thus the number of image samples required to be tagged is reduced.

The operation S14 may include that: the to-be-tagged image sample in the first to-be-tagged image sample set is displayed, and tag information for the tagged image sample is received to obtain the tag.

Once the tag of a to-be-tagged image sample is obtained, the to-be-tagged image sample is turned into a tagged image sample, and the tagged image sample is added into the tagged image sample set. Therefore, updating of the tagged image sample set in S15 is implemented.

Next, training of the image recognition model is continued by the use of the updated tagged image sample set.

For example, model training is performed by the use of the whole updated tagged image sample set. Therefore, on the one hand, it is ensured that the recognition capability of the image recognition model for images for which the recognition capability is originally high may be maintained after the training is complete. On the other hand, due to the introduction of new tagged image samples, the image recognition model may be endowed with a recognition capability for other images.

For another example, training may also be performed, preferably by the use of newly added image samples in the tagged image sample set only. After the training is complete, it is determined through a test set whether the recognition capability of the retrained image recognition model for images similar to the image samples is maintained. If the recognition capability is maintained, the old image samples are not used for training, and S12 to S16 may be continued to be executed; and if the recognition capability is not maintained, the training is continued by the use of the old image samples. After the training is performed by the use of the whole updated tagged image sample set, S12 to S16 are continued to be executed.

In some embodiments, the trained image recognition model, after being obtained, may be used to recognize images, and then the recognized images are outputted and displayed on the terminal device such as a computer, a digital broadcast terminal, a messaging device, a gaming console, a tablet, a medical device, exercise equipment and the like.

In some embodiments of the present disclosure, an image recognition model with an initial image recognition capability is trained at first by using a small number of tagged positive image samples and tagged negative image samples. Then, the to-be-tagged image sample in the first to-be-tagged image sample set is recognized by using the image recognition model, and the to-be-tagged image sample of which the confidence is within the preset interval is selected according to the confidence of the recognition result obtained by the image recognition model. The selected to-be-tagged image samples, i.e., images for which the present recognition capability of the image recognition model needs to be enhanced is tagged, and the selected to-be-tagged image samples with a high recognition confidence are not required to be tagged so that the number of image samples required to be tagged in a model training process is reduced, and the manual tagging workload is reduced. In this way, training of the image recognition model can be achieved by tagging a small number of image samples, and the trained image recognition model is of high accuracy; on the other hand, the training speed of the image recognition model is increased, and the training cost of the image recognition model is reduced.

In some embodiments of the present disclosure, the image recognition model is trained for online or offline image recognition, and an obtained image recognition result obtained therefrom may be used to recommendation of images for browsing and/or intercept unwanted images. Thus, bad feelings when the user sees unwanted images are reduced, and the user experience is thereby improved.

Figure 2:
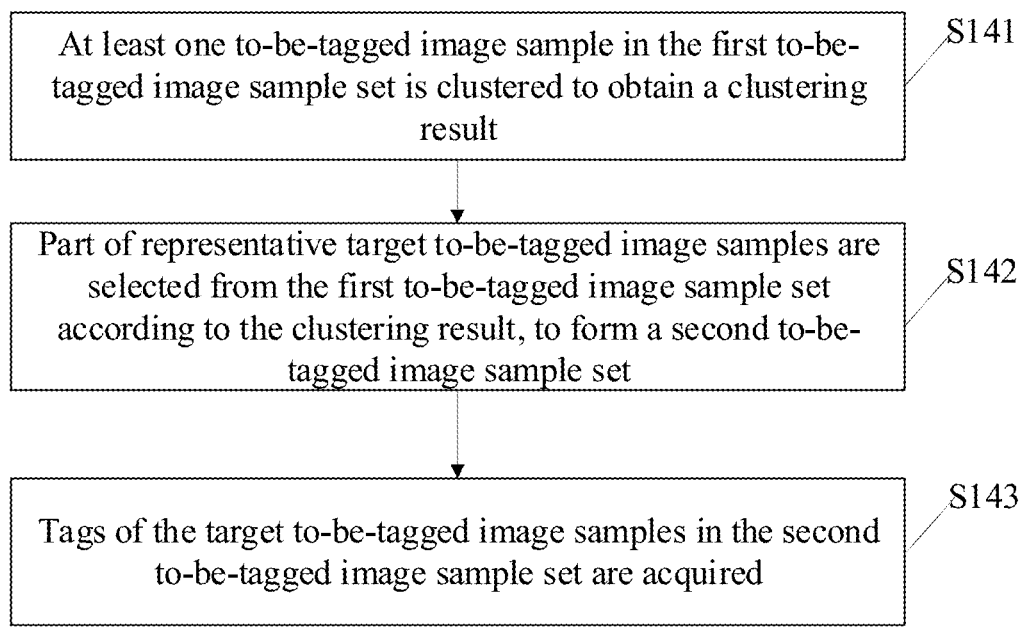
FIG. 2 is a flowchart showing a method for training an image recognition model, according to an example of the present disclosure.

In some embodiments, as shown in FIG. 2, S14 may include the following steps.

In S141, the at least one to-be-tagged image sample in the first to-be-tagged image sample set is clustered to obtain a clustering result.

In S142, part of target to-be-tagged image samples that have cluster representativeness are selected from the first to-be-tagged image sample set according to the clustering result to form a second to-be-tagged image sample set.

In S143, tags of target to-be-tagged image samples in the second to-be-tagged image sample set are acquired.

In some embodiments of the present disclosure, for further reducing the number of the to-be-tagged image samples, clustering may be performed after the first to-be-tagged image sample set is obtained. For example, the to-be-tagged image samples in the first to-be-tagged image sample set may be clustered into N clusters, N being a positive integer. A clustering algorithm may adopt any clustering algorithm. For example, a k-means clustering algorithm is selected for clustering, or an entropy clustering algorithm is selected for clustering.

Multiple clusters may be formed by clustering. A cluster including more than two to-be-tagged image samples may include multiple similar to-be-tagged image samples, and due to the similarity among the to-be-tagged image samples, part of representative to-be-tagged image samples may be selected from each cluster to form the second to-be-tagged image sample set. It is apparent that the number of the to-be-tagged image samples in the second to-be-tagged image sample set may be smaller than the number of the to-be-tagged image samples in the first to-be-tagged image sample set.

The to-be-tagged image samples having cluster representativeness may be representative of a corresponding cluster. Multiple images forming a cluster may be distributed differently, some of the multiple images may be located in or closest to the center of the cluster, and some may be around the cluster. The cluster representativeness of the images in the center of the cluster is more representative than those around the cluster and can be a better representative of the corresponding cluster.

Furthermore, S141 may include that: information entropy of the to-be-tagged image sample is determined according to image features of the to-be-tagged image sample in the first to-be-tagged image sample set; and the to-be-tagged image sample of which the information entropy meets a predetermined condition is selected and clustered to obtain K clusters and a cluster center of each cluster, K being a positive integer.

During clustering, the clustering is not performed on all to-be-tagged image samples in the first to-be-tagged image sample. Instead, the information entropies are calculated, and the to-be-tagged image sample of which the information entropy meets the predetermined condition is selected for clustering. In such a manner, the to-be-tagged image samples are filtered once before clustering, and thus the to-be-tagged image samples in the second to-be-tagged image sample set are reduced.

For example, the operation that the to-be-tagged image sample of which the information entropy meets the predetermined condition is selected for clustering may include one of the following operations:

the to-be-tagged image sample of which the information entropy is greater than an entropy threshold value is selected for clustering; and a predetermined number of to-be-tagged image samples with maximum information entropies are selected for clustering.

The information entropy is determined according to the image feature of the to-be-tagged image sample in the first to-be-tagged image sample set. If the information entropy is greater than an entropy threshold value, the amount of information in the corresponding to-be-tagged image sample is larger, and it is more meaningful to adopt it for training the image recognition model.

The cluster center may be as follows: multiple to-be-tagged image samples are mapped into a predetermined space, each to-be-tagged image sample is distributed in the form of points in the predetermined space, where clusters are formed at which the points are concentrated, and the cluster center is a center coordinate of a cluster or a coordinate of the to-be-tagged image sample represented by the center point in the cluster.

The to-be-tagged image sample at a shorter distance from the cluster center is more representative than the to-be-tagged image sample at a relatively long distance from the cluster center.

Herein, the distance includes, but not limited to, a Euclidean distance.

The clustering result includes multiple clusters formed by clustering and the cluster center of each cluster. In some embodiments, the operation S142 may include that: one or more to-be-tagged image samples closest to the corresponding cluster center are selected from each of the multiple clusters as the target to-be-tagged image samples having the cluster representativeness, to form the second to-be-tagged image sample set.

For example, in some embodiments, a predetermined number of representatives to-be-tagged image samples are selected from a cluster to form the second to-be-tagged image sample set.

If S1 to-be-tagged image samples are clustered, and the number of the representative to-be-tagged image samples in each cluster may be S2, where S2 is usually smaller than S1. In this way, the number of the to-be-tagged image samples contained in the second to-be-tagged image sample set are further reduced.

In some embodiments, the method further includes that:
after the first to-be-tagged image sample set is formed, whether the number of the to-be-tagged image sample in the first to-be-tagged image sample set is greater than a preset value is determined.

The operation S14 may include that: when the number of the to-be-tagged image sample in the first to-be-tagged image sample set is greater than the preset value, the tags of the to-be-tagged image samples in the first to-be-tagged image sample set are acquired.

For the presently formed first to-be-tagged image sample set, training of the image recognition model may be stopped if the number of the to-be-tagged image samples in the present first to-be-tagged image sample set is smaller than the preset value. For example, the preset value may be any predetermined value, and the preset value may be a single digit, tens digit or hundreds digit, etc. The preset value may be a predetermined percentage of the to-be-tagged image samples in the to-be-tagged image sample set. For example, the percentage is 0.1%, and if the to-be-tagged image sample set includes 10,000 to-be-tagged image samples, the preset value may be 10. If the number of the to-be-tagged image samples collected in the first to-be-tagged image sample set obtained in S11 to S13 is smaller than 10, it is considered that the recognition capability of the present image recognition model has been high enough and training of the image recognition model may be stopped. In such a case, the to-be-tagged image samples in the first to-be-tagged image sample set may not be output anymore to acquire the tags.

If the number of the to-be-tagged image samples in the first to-be-tagged image sample set is greater than the preset value, it is indicated that further training of the image recognition model is required, and then the tags of the to-be-tagged image samples in the first to-be-tagged image sample set may be acquired.

In some embodiments, all the to-be-tagged image samples in the whole first to-be-tagged image sample set may be output to obtain the tags. In some embodiments, for further reducing the number of the to-be-tagged image samples, part of representative to-be-tagged image samples in the first to-be-tagged image sample set may be selected in a clustering manner to be tagged, so as to obtain the tags. In such a manner, through the acquisition of the tags of part of to-be-tagged image samples, training of the image recognition model is continued, so that on the one hand, the number of the image samples required to be tagged is further reduced, and on the other hand, the accuracy of the trained image recognition model is also ensured.

In some embodiments, the method further includes that:
when the number of the to-be-tagged image sample in the first to-be-tagged image sample set is less than or equal to the preset value, training of the image recognition model is stopped.

If the number of the to-be-tagged image samples in the first to-be-tagged image sample set is less than or equal to the preset value, it is indicated that the accuracy of the image recognition model is high enough, and at this time, unnecessary training can be stopped.

In some embodiments, S16 may include that: the step that the image recognition model is trained is re-executed by using the updated tagged image sample set. Herein, after the tagged image sample set is updated, the method returns to S11 to iteratively train the image recognition model using the updated tagged image sample set. The training process including the above steps S11 to S16 may be repeated multiple times. In some embodiments, the tagged image sample set includes a first number of positive image samples and a second number of negative image samples, the first number being smaller than the second number.

Figure 3A:
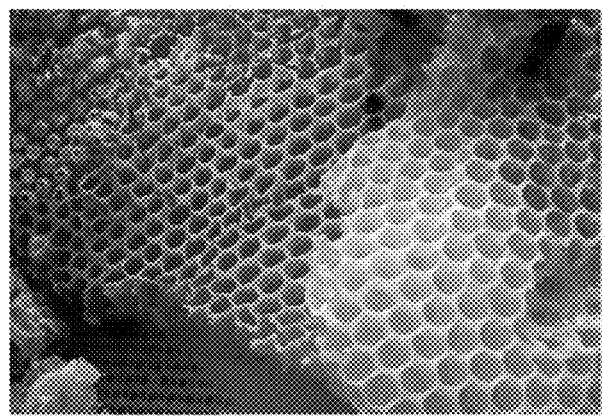
FIG. 3A is a schematic diagram illustrating an effect of an intensive phobia image, according to an example of the present disclosure.
Figure 3B:
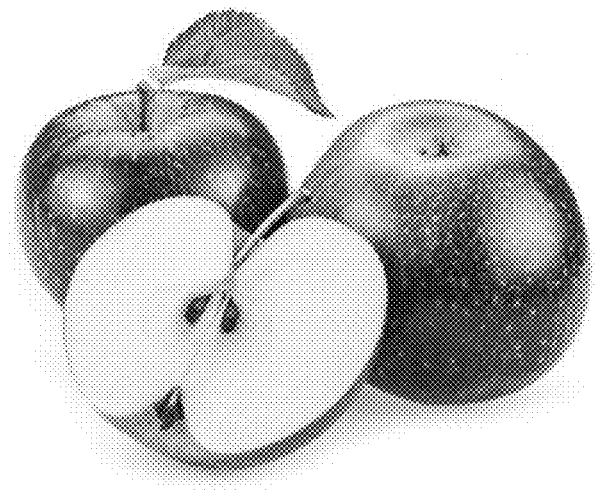
FIG. 3B is a schematic diagram illustrating an effect of a normal image, according to an example of the present disclosure.

For example, for an intensive phobia image, the positive image sample is an image shown in FIG. 3A, and the negative image sample is an image that would not bring bad feelings, for example, as shown in FIG. 3B. The intensive phobia image is an image where a distribution density of identical or similar graphic elements is greater than a preset value. Under some conditions, an intensive phobia image is related to a subjective feeling of a person and refers to an image including a large number of identical or similar graphic elements. The positive image sample includes an intensive phobia image tagged as an intensive image, and the negative image sample is an image except the intensive phobia image.

In some embodiments, the positive image sample may be a pornographic image, and the negative image sample may be any normal image except the pornographic image. For example, the pornographic image may be an image in which a specific part of a human body is naked.

In some embodiments, the positive image sample may be a violence-related image, and the negative image sample may be any normal image except the violence-related image. For example, the violence-related image may be an image related to a bloody scene.

In some embodiments of the present disclosure, the image recognition model may be an image recognition model that distinguishes images based on frequencies of the times of occurrence of repeated elements. Image types include, but not limited to, intensive phobia images or normal images.

A small number of images of the target type, such as intensive phobia images, may be contained in a large number of normal images. In view of this, in some embodiments of the present disclosure, the number of the positive image samples is smaller than the number of the negative image samples, and thus the accuracy of recognition is relatively high for the trained image recognition model.

In some embodiments, the first to-be-tagged image sample set includes a third number of to-be-tagged image samples, the third number being larger than the second number.

Herein, the third number is larger than the second number. The third number may usually be far larger than the second number. For example, the third number may exceed the second number by one or more orders of magnitude. Therefore, manual tagging may be reduced as much as possible.

Figure 4:
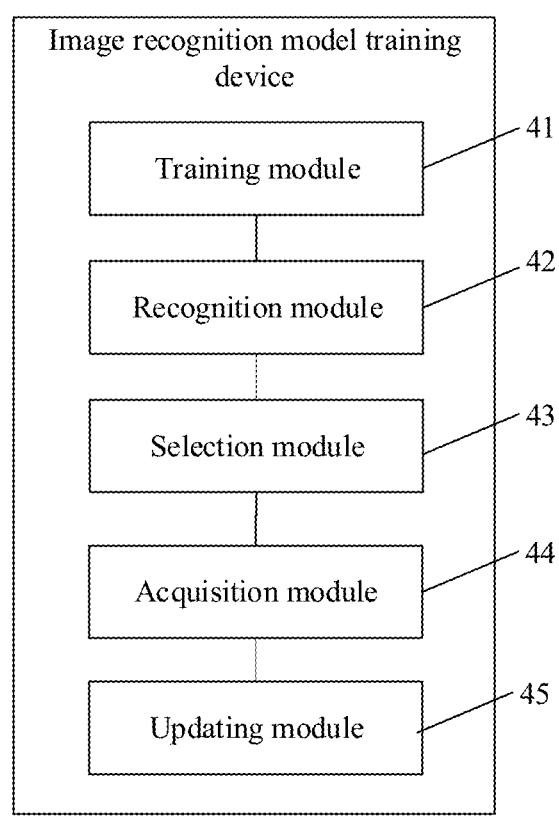
FIG. 4 is a schematic block diagram of a device for training an image recognition model, according to examples of the present disclosure.

As shown in FIG. 4, an embodiment provides a device for training an image recognition model, which includes:

a training module 41, configured to train an image recognition model by using a tagged image sample set;

a recognition module 42, configured to recognize multiple to-be-tagged image samples in a to-be-tagged image sample set by using the presently trained image recognition model to obtain a confidence of a recognition result corresponding to each of the multiple to-be-tagged image samples;

a selection module 43, configured to select the to-be-tagged image sample of which the confidence is within a preset interval to form a first to-be-tagged image sample set;

an acquisition module 44, configured to acquire tags of to-be-tagged image samples in the first to-be-tagged image sample set; and an updating module 45, configured to update the tagged image sample set according to the acquired tags.

The training module 41 is further configured to continue training the image recognition model by using the updated tagged image sample set.

In some embodiments, the training module 41, the recognition module 42, the selection module 43, the acquisition module 44, and the updating module 45 may be program modules. The program modules, upon being executed by a processor, are enabled to obtain an image recognition model with high recognition accuracy trained by tagging as few image samples as possible.

In some embodiments, the training module 41, the recognition module 42, the selection module 43, the acquisition module 44, and the updating module 45 may be combined software and hardware modules. The combined software and hardware modules may include various programmable arrays. The programmable arrays include, but not limited to, a complex programmable array or a field programmable array.

In some embodiments, the training module 41, the recognition module 42, the selection module 43, the acquisition module 44, and the updating module 45 may be pure hardware modules. The pure hardware modules may include an Application Specific Integrated Circuit (ASIC).

In some embodiments, the acquisition module 44 is specifically configured to cluster the at least one to-be-tagged image sample in the first to-be-tagged image sample set to obtain a clustering result, select a part of target to-be-tagged image samples having cluster representativeness from the first to-be-tagged image sample set according to the clustering result to form a second to-be-tagged image sample set; and acquire tags of all or part of the target to-be-tagged image samples in the second to-be-tagged image sample set.

In some embodiments, the clustering result includes one or more clusters formed by clustering and a cluster center of each of the one or more clusters.

The acquisition module 44 is specifically configured to determine information entropy of a to-be-tagged image sample according to image features of the to-be-tagged image sample in the first to-be-tagged image sample set and select and cluster to-be-tagged image samples of which the information entropy meets a predetermined condition to obtain K clusters and a cluster center of each cluster, K being a positive integer.

In some embodiments, the acquisition module 44 is further specifically configured to select, from each of the one or more clusters, one or more to-be-tagged image samples closest to the corresponding cluster center as the target to-be-tagged image samples having the cluster representativeness, to form the second to-be-tagged image sample set.

In some embodiments, the device further includes:

a determination module, configured to, after the first to-be-tagged image sample set is formed, determine whether the number of the to-be-tagged image sample in the first to-be-tagged image sample set is greater than a preset value; and the acquisition module 44 is configured to, when the number of the to-be-tagged image samples in the first to-be-tagged image sample set is greater than the preset value, acquire the tags of the to-be-tagged image samples in the first to-be-tagged image sample set.

In some embodiments, the device further includes:

a stopping module, configured to, when the number of the to-be-tagged image sample in the first to-be-tagged image sample set is less than or equal to the preset value, stop training of the image recognition model.

In some embodiments, the training module 41 is further configured to re-execute the step of training the image recognition model by using the updated tagged image sample set.

In some embodiments, the tagged image sample set includes a first number of positive image samples and a second number of negative image samples, the first number being smaller than the second number; and/or, the first to-be-tagged image sample set includes a third number of to-be-tagged image samples, the third number being larger than the second number.

In some embodiments, the positive image sample includes an intensive phobia image tagged as an intensive image, and the negative image sample is an image except the intensive phobia image.

A specific example will be provided below in combination with any above-mentioned embodiment.

Example 1

The example relates to an active deep learning-based method for tagging and recognizing intensive phobia picture, which may include the following contents.

In an information flow recommendation system (for example, Miui browser, Tencent News, and Toutiao), the recommended contents are usually presented as texts and pictures, regardless of the form. Compared with text, a picture has become an important part of a recommended information flow content by virtue of its characteristics of visualization, strong impact, and easiness for rapid browsing.

Before a recommended picture content is presented to a user, a reviewing process for the picture is further required. A related reviewing manner is mainly manual reviewing, which is relatively low in efficiency and cannot deal with sharply increasing massive picture data to review and recognize pictures including bad information such as pornographic, violence-related, terrorist-related and politically sensitive information and completely eradicate propagation and recommendation of such pictures including bad information. In addition, for recognition and reviewing of pictures visually discomforting people, for example, intensive phobia pictures, there are relatively few such products on the market, and most of them do not review such pictures (resulting in poor user experiences in recommended contents), or the low-efficiency manual reviewing manner is still adopted, consuming time and labor.

The example aims to efficiently select most useful pictures that possibly belong to an intensive phobia type as few as possible for necessary manual tagging to further continuously expand a tagged sample set, so as to train a deep learning model with increasingly high classification performance to achieve recognition and reviewing of intensive phobia pictures more accurately.

A small amount of manually tagging is performed, and samples tagged as the intensive phobia type are added into the original tagged sample set, thereby increasing the number of intensive phobia picture samples.

For example, before an image recognition model is trained, the sample set includes a tagged image sample set and a to-be-tagged image sample set. All image samples in the tagged image sample set have been tagged and tags are obtained. The to-be-tagged image sample set only includes image samples, which are not tagged with tags.

At first, model training is performed by use of the tagged image sample set, the image recognition model obtained after training for a period of time are used to recognize the image samples in the to-be-tagged image sample set to obtain recognition results and confidences, and part of to-be-tagged image samples required to be manually tagged are selected according to the confidences to form a set, so that the workload of manual tagging for obtaining image sample tags may be reduced.

Furthermore, after a set including multiple to-be-tagged image samples is obtained according to the confidences, further filtering may be performed in an image clustering manner to reduce the number of the to-be-tagged image samples required to be manually tagged.

Example 2

The example provides a method for training an image recognition model, which may include:
inputting data which is a tagged image sample set including a small number of tagged intensive phobia image samples (recorded as positive image samples) and a large number of tagged normal image samples (recorded as negative image samples), and a to-be-tagged image sample set including a large number of untagged images.

Figure 5:
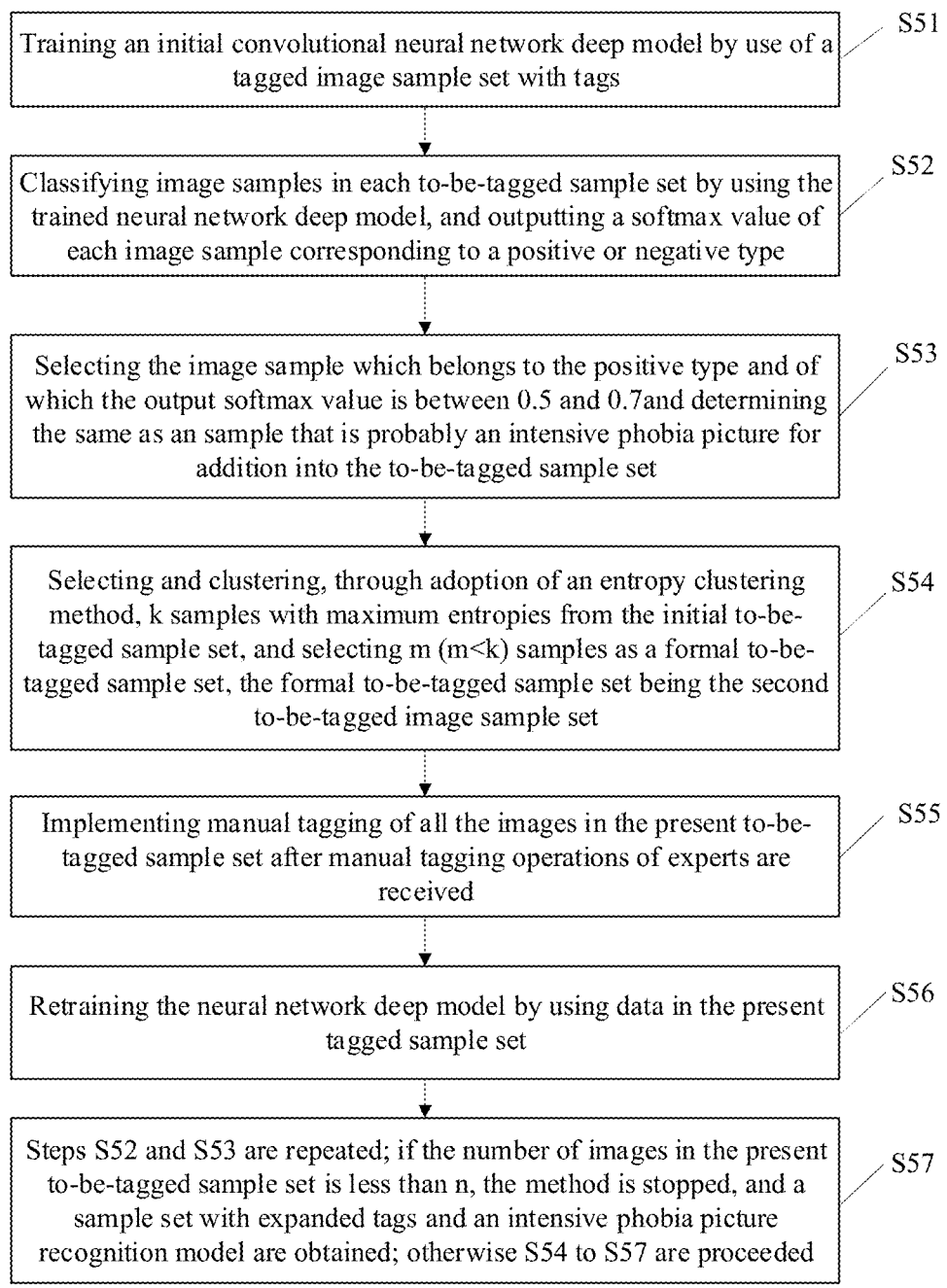
FIG. 5 is a flowchart showing a method for training an image recognition model training method, according to an example of the present disclosure.

As shown in FIG. 5, an active deep learning-based image tagging and recognition method include the following steps.

In S51, an initial convolutional neural network deep model is trained by the use of a tagged image sample set with tags. Since the number of positive image samples with tags is relatively small, a recognition capability of the present deep model for intensive phobia pictures is relatively low.

In S52, each image sample in the to-be-tagged sample set is classified by use of the presently trained convolutional neural network deep model, and a softmax value of each image sample corresponding to a positive or negative type is output. The softmax value may be understood as a confidence that the image sample is determined to belong to each type of image sample, and if the softmax value is closer to 1, the confidence is higher and the probability that the image sample belongs to this type is higher.

In S53, the image sample which belongs to the positive type and of which the output softmax value is between 0.5 and 0.7 is selected and determined as a sample that is probably an intensive phobia picture for addition to the to-be-tagged sample set. Herein, the positive type is a type to which the positive image samples belong. Herein, the to-be-tagged sample set is the above-mentioned first to-be-tagged image sample set.

In S54, through the adoption of an entropy clustering method, k samples with maximum entropies are selected from the initial to-be-tagged sample set and clustered, and m (m<k) samples are selected as a formal to-be-tagged sample set. Herein, the formal to-be-tagged sample set is the above-mentioned second to-be-tagged image sample set.

In S55, manual tagging operations of experts are received to implement manual tagging of all the images in the present to-be-tagged sample set, which specifically includes that: the samples 100% absolutely determined as normal pictures are added into the tagged image sample set; the samples 100% absolutely determined as intensive phobia pictures are added into the tagged image sample set, and the pictures that cannot be absolutely determined to belong to the intensive phobia type are discarded and not put into any dataset anymore.

In S56, the deep model is retrained by the use of data in the present tagged sample set. Thus, the recognition capability of the present deep model for intensive phobia pictures is further improved.

In S58, S52 and S53 are repeated; if the number of the images in the present to-be-tagged sample set is less than n, the method is stopped, and a sample set with expanded tags and an intensive phobia picture recognition model is obtained; otherwise S54 to S57 are continued.

An embodiment of the present disclosure also provides a device for training an image recognition model, which includes a processor, a memory for storing computer-executable instructions executable by the processor, where the processor executes the computer-executable instructions to implement the method for training an image recognition model training provided in any above-mentioned embodiments, for example, executing the methods shown in FIG. 1, FIG. 2 and FIG. 5.

Figure 6:
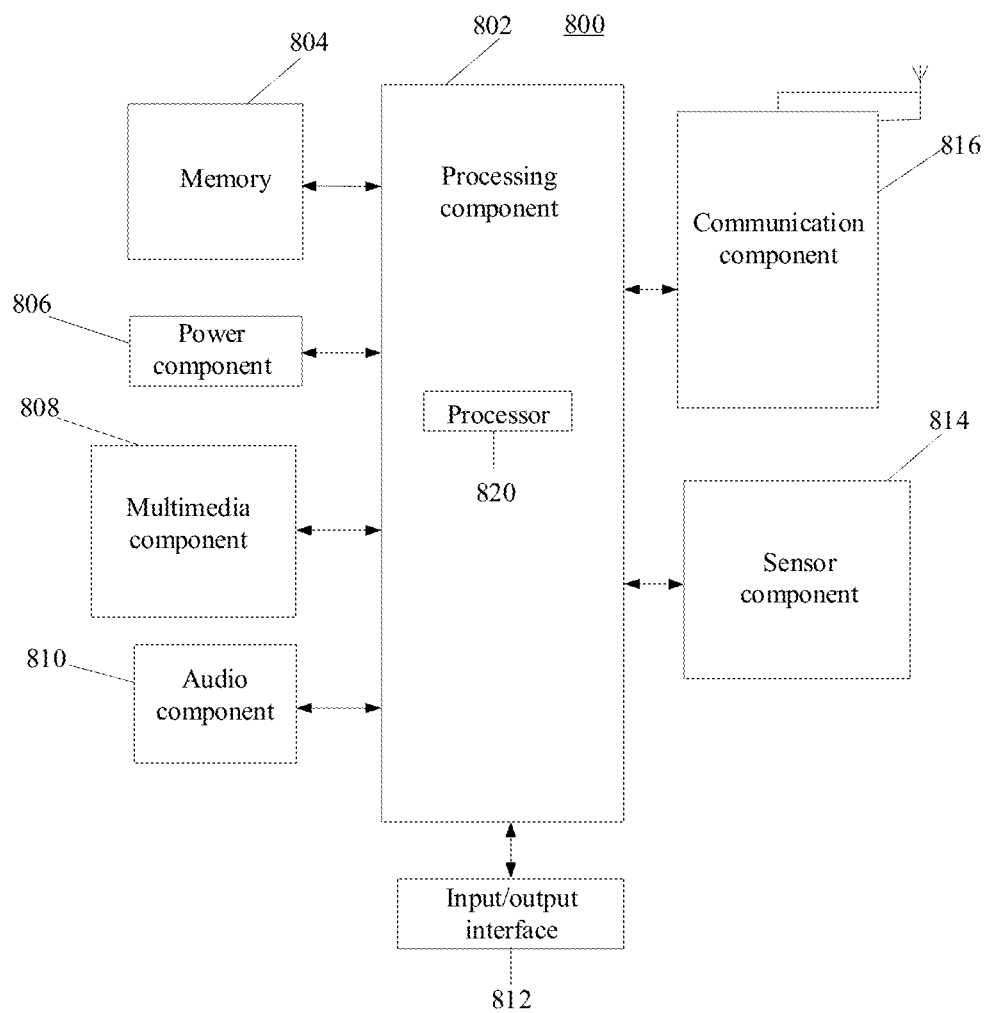
FIG. 6 is a block diagram of a device for training an image recognition model, according to an example of the present disclosure.

FIG. 6 is a block diagram of an image recognition model training device 800, according to an embodiment. For example, the device 800 may be a mobile phone, a computer, a digital broadcast terminal, a messaging device, a gaming console, a tablet, a medical device, exercise equipment, a personal digital assistant, and the like.

Referring to FIG. 6, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with a display, telephone calls, data communications, camera operations, and recording operations. The processing component 802 may include one or more processors 820 to execute instructions to perform all or part of the steps in the above-mentioned method. Moreover, the processing component 802 may include one or more modules that facilitate interaction between the processing component 802 and the other components. For instance, the processing component 802 may include a multimedia module to facilitate interaction between the multimedia component 808 and the processing component 802.

The memory 804 is configured to store various types of data to support the operations of the device 800. Examples of such data include instructions for any applications or methods operated on device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management, and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes, and gestures on the TP. The touch sensors may sense not only a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode, and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button, and the like. The button may include, but not limited to: a home button, a volume button, a starting button, and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect the presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between device 800 and another device. The device 800 may access a communication-standard-based wireless network, such as a Wireless Fidelity (WiFi) network, a 2nd-Generation (2G) or 3rd-Generation (3G) network or a combination thereof. In one or more embodiments, the communication component 816 receives a broadcast signal or broadcast associated information from an external broadcast management system through a broadcast channel. In one or more embodiments, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology, and another technology.

In one or more embodiments, the device 800 may be implemented by one or more ASICs, Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In one or more embodiments, there is also provided a non-transitory computer-readable storage medium including an instruction, such as the memory 804 including an instruction, and the instruction may be executed by the processor 820 of the device 800 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

One or more embodiments of the present disclosure also provides a non-transitory computer-readable storage medium, which may be called a storage medium for short. Computer-executable instructions stored in the storage medium, when being executed by a processor, enable the processor to execute the method for training an image recognition model, the method including that: an image recognition model is trained by using a tagged image sample set; multiple to-be-tagged image samples in a to-be-tagged image sample set are recognized by using the presently trained image recognition model to obtain a confidence level of a recognition result corresponding to each of the multiple to-be-tagged image samples; at least one to-be-tagged image sample of which the confidence is in a preset interval is selected as at least one to-be-tagged image sample to form a first to-be-tagged image sample set; tags of the to-be-tagged image sample in the first to-be-tagged image sample set are acquired; the tagged image sample set is updated according to the acquired tags; and the image recognition model is continued to be trained by using the updated tagged image sample set.

The operation that the tags of the to-be-tagged image sample in the first to-be-tagged image sample set are acquired includes that: the at least one to-be-tagged image sample in the first to-be-tagged image sample set is clustered to obtain a clustering result; part of target to-be-tagged image samples having cluster representativeness are selected from the first to-be-tagged image sample set according to the clustering result to form a second to-be-tagged image sample set; and tags of all or part of target to-be-tagged image samples in the second to-be-tagged image sample set are acquired.

The operation that the at least one to-be-tagged image sample in the first to-be-tagged image sample set is clustered to obtain the clustering result includes that: information entropy of a to-be-tagged image sample is determined according to image features of the to-be-tagged image sample in the first to-be-tagged image sample set; and the to-be-tagged image samples of which the information entropy meets a predetermined condition is selected and clustered to obtain K clusters and a cluster center of each cluster, K being a positive integer.

The clustering result includes one or more clusters formed by clustering and a cluster center of each of the one or more clusters; and the operation that part of target to-be-tagged image samples having the cluster representativeness are selected from the first to-be-tagged image sample set according to the clustering result to form the second to-be-tagged image sample set includes that: one or more to-be-tagged image samples closest to the corresponding cluster center are selected from each of the one or more clusters as the target to-be-tagged image samples having the cluster representativeness, to form the second to-be-tagged image sample set.

The method further includes that: after the first to-be-tagged image sample set is formed, whether the number of the to-be-tagged image sample in the first to-be-tagged image sample set is greater than a preset value is determined; and the operation that the tags of the to-be-tagged image sample in the first to-be-tagged image sample set are acquired includes that: when the number of the to-be-tagged image samples in the first to-be-tagged image sample set are greater than the preset value, the tags of the to-be-tagged image sample in the first to-be-tagged image sample set are acquired.

The method further includes that: when the number of the to-be-tagged image samples in the first to-be-tagged image sample set are less than or equal to the preset value, training of the image recognition model is stopped. The operation that the image recognition model is continued to be trained by using the updated tagged image sample set includes that: the step that the image recognition model is trained is re-executed by use of the updated tagged image sample set.

The tagged image sample set includes a first number of positive image samples and a second number of negative image samples, the first number being smaller than the second number; and/or, the first to-be-tagged image sample set includes a third number of to-be-tagged image samples, the third number being larger than the second number.

The positive image sample includes an intensive phobia image tagged as an intensive image, and the negative image sample is an image except the intensive phobia image.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments will be apparent to those skilled in the art from consideration of the specification and practice of the present disclosure. This disclosure is intended to cover any variations, uses, or adaptations of the present disclosure following the general principles thereof and including such departures from the present disclosure as come within the known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings and that various modifications and changes may be made without departing from the scope thereof. It is intended that the scope of the present disclosure only be limited by the appended claims.

The embodiments of the present disclosure may have the following beneficial effects. In some embodiments of the present disclosure, an image recognition model with an initial image recognition capability is obtained by training at first by use of a small number of tagged positive image samples and negative image samples. Then, to-be-tagged image samples in the first to-be-tagged image sample set are recognized by using the image recognition model, and the to-be-tagged image samples of which the confidence is within the preset interval are selected according to the confidence of the recognition result obtained by the image recognition model. The selected to-be-tagged image samples, i.e., images for which the present recognition capability of the image recognition model needs to be enhanced is tagged, and the selected to-be-tagged image samples with a high recognition confidence is not required to be tagged, so that the number of image samples required to be tagged in a model training process is reduced, and the manually tagging workload is reduced. In this way, training of the image recognition model can be achieved by tagging a small number of image samples, and the trained image recognition model is of high accuracy; on the other hand, the training speed of the image recognition model is increased, and the training cost of the image recognition model is reduced.

What is claimed is:

1. A method for training an image recognition model, the method comprising:

training, by a terminal device, an image recognition model by using a tagged image sample set;

recognizing, by the terminal device, multiple to-be-tagged image samples in a to-be-tagged image sample set by using the image recognition model to obtain a confidence level of a recognition result corresponding to each of the multiple to-be-tagged image samples;

selecting, by the terminal device, at least one to-be-tagged image sample of which the confidence level is within a preset interval to form a first to-be-tagged image sample set;

acquiring, by the terminal device, tags of to-be-tagged image samples in the first to-be-tagged image sample set;

obtaining, by the terminal device, an updated tagged image sample set by updating the tagged image sample set according to the acquired tags; and training, by the terminal device, the image recognition model by using the updated tagged image sample set, wherein acquiring, by the terminal, the tags of the to-be-tagged image samples in the first to-be-tagged image sample set comprises:

clustering, by the terminal device, the at least one to-be-tagged image sample in the first to-be-tagged image sample set to obtain a clustering result;

selecting, by the terminal device, part of target to-be-tagged image samples having cluster representativeness from the first to-be-tagged image sample set according to the clustering result to form a second to-be-tagged image sample set; and acquiring, by the terminal device, tags of target to-be-tagged image samples in the second to-be-tagged image sample set; and wherein clustering, by the terminal device, the at least one to-be-tagged image sample in the first to-be-tagged image sample set to obtain the clustering result comprises:

determining, by the terminal device, information entropy of a to-be-tagged image sample according to image features of the to-be-tagged image sample in the first to-be-tagged image sample set; and clustering, by the terminal device, to-be-tagged image samples of which the information entropy meets a predetermined condition to obtain K clusters and a cluster center of at least one cluster, K being a positive integer.

2. The method of claim 1, wherein selecting, by the terminal device, part of target to-be-tagged image samples having the cluster representativeness from the first to-be-tagged image sample set according to the clustering result to form the second to-be-tagged image sample set comprises:

selecting, by the terminal device, from one or more clusters, one or more to-be-tagged image samples closest to a cluster center of the cluster as the target to-be-tagged image samples having cluster representativeness, to form the second to-be-tagged image sample set, wherein the clustering result comprises the one or more clusters formed by clustering and a cluster center of at least one of the one or more clusters.

3. The method of claim 1, wherein acquiring, by the terminal device, the tags of the to-be-tagged image samples in the first to-be-tagged image sample set comprises:

determining, after the first to-be-tagged image sample set is formed, whether a number of the to-be-tagged image samples in the first to-be-tagged image sample set is greater than a preset value; and acquiring, by the terminal device when the number of the to-be-tagged image samples in the first to-be-tagged image sample set is greater than the preset value, the tags of the to-be-tagged image samples in the first to-be-tagged image sample set.

4. The method of claim 3, further comprising:

stopping, by the terminal device when the number of the to-be-tagged image samples in the first to-be-tagged image sample set is less than or equal to the preset value, training of the image recognition model.

5. The method of claim 4, wherein training, by the terminal device, the image recognition model by using the updated tagged image sample set comprises:

retraining, by the terminal device, the image recognition model by using the updated tagged image sample set.

6. The method of claim 1, wherein the tagged image sample set comprises a first number of positive image samples and a second number of negative image samples, wherein the first number comprises a smaller number than the second number; or wherein the first to-be-tagged image sample set comprises a third number of to-be-tagged image samples, wherein the third number comprises a number larger than the second number.

7. The method of claim 6, wherein the positive image sample comprises an intensive phobia image tagged as an intensive image, and the negative image sample is an image except the intensive phobia image.

8. The method of claim 1, further comprising:

recognizing, by the terminal device, images by using the trained image recognition model;

and displaying, by the terminal device, the recognized images.

9. A device for training an image recognition model, comprising:

one or more processors; and a non-transitory computer-readable storage medium storing instructions executable by the one or more processors, wherein the one or more processors are configured to:

train an image recognition model by using a tagged image sample set;

recognize multiple to-be-tagged image samples in a to-be-tagged image sample set by using the image recognition model to obtain a confidence level of a recognition result corresponding to each of the multiple to-be-tagged image samples;

select at least one to-be-tagged image sample of which the confidence level is within a preset interval as at least one to-be-tagged image sample to form a first to-be-tagged image sample set;

acquire tags of to-be-tagged image samples in the first to-be-tagged image sample set;

obtain an updated tagged image sample set by updating the tagged image sample set according to the acquired tags; and train the image recognition model by using the updated tagged image sample set;

cluster the at least one to-be-tagged image sample in the first to-be-tagged image sample set to obtain a clustering result select part of target to-be-tagged image samples having cluster representativeness from the first to-be-tagged image sample set according to the clustering result to form a second to-be-tagged image sample set acquire tags of target to-be-tagged image samples in the second to-be-tagged image sample set and determine information entropy of a to-be-tagged image sample according to image features of the to-be-tagged image sample in the first to-be-tagged image sample set, and cluster to-be-tagged image samples of which the information entropy meets a predetermined condition to obtain K clusters and a cluster center of at least one cluster, K being a positive integer.

10. The device of claim 9, wherein the one or more processors are further configured to:

select, from one or more clusters, one or more to-be-tagged image samples closest to a cluster center of the cluster as the target to-be-tagged image samples having cluster representativeness, to form the second to-be-tagged image sample set, wherein the clustering result comprises the one or more clusters formed by clustering and a cluster center of at least one cluster.

11. The device of claim 9, wherein the one or more processors are further configured to:

determine, after the first to-be-tagged image sample set is formed, whether a number of to-be-tagged image samples in the first to-be-tagged image sample set is greater than a preset value; and acquire, when the number of the to-be-tagged image samples in the first to-be-tagged image sample set is greater than the preset value, the tags of the to-be-tagged image samples in the first to-be-tagged image sample set.

12. The device of claim 11, wherein the one or more processors are further configured to:

stop, when the number of the to-be-tagged image samples in the first to-be-tagged image sample set is less than or equal to the preset value, training of the image recognition model.

13. The device of claim 12, wherein the one or more processors are further configured to:

retraining the image recognition model by using the updated tagged image sample set.

14. The device of claim 9, wherein the tagged image sample set comprises a first number of positive image samples and a second number of negative image samples, wherein the first number comprises a smaller number than the second number; or wherein the first to-be-tagged image sample set comprises a third number of to-be-tagged image samples, wherein the third number comprises a number larger than the second number.

15. The device of claim 14, wherein the positive image sample comprises an intensive phobia image tagged as an intensive image, and the negative image sample is an image except the intensive phobia image.

16. A non-transitory computer storage medium, having computer-executable instruction stored thereon, wherein the computer-executable instructions, when executed by one or more processors, enable the one or more processors to implement acts comprising:

training an image recognition model by using a tagged image sample set;

recognizing multiple to-be-tagged image samples in a to-be-tagged image sample set by using the image recognition model to obtain a confidence level of a recognition result corresponding to each of the multiple to-be-tagged image samples;

selecting at least one to-be-tagged image sample of which the confidence level is within a preset interval to form a first to-be-tagged image sample set;

acquiring tags of to-be-tagged image samples in the first to-be-tagged image sample set;

obtaining an updated tagged image sample set by updating the tagged image sample set according to the acquired tags; and training the image recognition model by using the updated tagged image sample set wherein acquiring, by the terminal, the tags of the to-be-tagged image samples in the first to-be-tagged image sample set comprises:

clustering, by the terminal device, the at least one to-be-tagged image sample in the first to-be-tagged image sample set to obtain a clustering result selecting, by the terminal device, part of target to-be-tagged image samples having cluster representativeness from the first to-be-tagged image sample set according to the clustering result to form a second to-be-tagged image sample set and acquiring, by the terminal device, tags of target to-be-tagged image samples in the second to-be-tagged image sample set and wherein clustering, by the terminal device, the at least one to-be-tagged image sample in the first to-be-tagged image sample set to obtain the clustering result comprises:

determining, by the terminal device, information entropy of a to-be-tagged image sample according to image features of the to-be-tagged image sample in the first to-be-tagged image sample set and clustering, by the terminal device, to-be-tagged image samples of which the information entropy meets a predetermined condition to obtain K clusters and a cluster center of at least one cluster, K being a positive integer.

* * * * *